United States Patent [19]

Esser et al.

[11] Patent Number: 4,883,954

[45] Date of Patent: Nov. 28, 1989

[54] METHOD OF MEASURING OPTICAL RADIATION ENERGY REFLECTED BY A REFLECTION AREA

[76] Inventors: Hildegard Esser, Birreshorner Strasse 55, 5000 Köln 41; Ulrich Grzesik, August Kierspel Str. 161, 5060 Bergisch Gladbach, both of Fed. Rep. of Germany

[21] Appl. No.: 212,812

[22] Filed: Jun. 29, 1988

[30] Foreign Application Priority Data

Jul. 2, 1987 [DE] Fed. Rep. of Germany ....... 3721823

[51] Int. Cl.$^4$ .............................................. H01J 5/16
[52] U.S. Cl. .................................. 250/227; 250/231 R
[58] Field of Search ................... 250/227, 226, 231 R; 356/73.1; 340/705

[56] References Cited

U.S. PATENT DOCUMENTS 4,421,979 12/1983 Asawa et al. ....................... 250/227
4,459,477 7/1984 Asawa et al. ....................... 250/227
4,497,575 2/1985 Philipp ............................. 350/96.15
4,692,610 9/1987 Szuchy .............................. 250/227

Primary Examiner—David C. Nelms
Assistant Examiner—Eric F. Chatman

[57] ABSTRACT

The invention relates to a method of measuring the optical radiation energy reflected by a reflection place as a relative fraction of energy supplied by an optical transmitter via an optical line. Using few components, reliable and constantly exact measuring values can be obtained in that the optical line (12,25) is connected to a backscattering measuring device (1) (OTDR) which transmits radiation in known manner via an optical connector (5) and which comprises a reception and evaluation device (6 and 7, respectively) for forming a measuring value which is proportional to the optical power backscattered in the optical connector (5) of the backscattering measuring device (1) and in that a reflection element (17, 19) having known reflection factor $R_N$ is arranged in the optical path between the connector (5) of the OTDR (1) and the end of an optical path comprising the reflection area (9) to be examined.

8 Claims, 1 Drawing Sheet

METHOD OF MEASURING OPTICAL RADIATION ENERGY REFLECTED BY A REFLECTION AREA

BACKGROUND OF THE INVENTION

The invention relates to a method of measuring the optical radiation energy reflected by a reflection place as a relative fraction of energy supplied by an optical transmitter via an optical line.

In a method of this type known from "International Electronical Commission, Technical Committee 86, Subcommittee 86B: Draft Publication YYY: Generic Specification for Fibre Optic Branching Devices-Optical Tests-Return Loss" the energy supplied to the reflection area and its reflected fraction must be determined by means of two successive measurements. Measuring errors are produced when the reception characteristic is changed, for example, due to long-time influences or temperature fluctuations. Furthermore, the known method must ensure stability and reproducibility of the properties of optical elements used, particularly directional couplers or connection elements.

SUMMARY OF THE INVENTION

To easily ensure reliable and constantly exact measuring values, the optical line is connected to a backscattering measuring device (OTDR) which transmits radiation in known manner via an optical connector. The OTDR has a reception and evaluation device for forming a measuring value which is proportional to the optical power backscattered in the optical connector of the backscattering measuring device. A reflection element having a known reflection factor is arranged in the optical path between the connector of the OTDR and the end of an optical path comprising the reflection place to be examined.

Conventional backscattering measuring devices (OTDR) for measuring light waveguide attenuation can be used for the method according to the invention. These devices have also made it possible to detect a reflection place, for example, in a connector pair. However, it was not possible to establish the exact fraction of the light power reflected by a transmission line. In a reflection element, which is included according to the invention and whose reflection factor is predetermined and known, two reflection levels are measured and, based on these levels, the wanted reflection factor of the reflection area can be found without a transmission power level being known.

Commercial backscattering measuring devices ensure an exact relative comparison of the reflection signals originating from different backscattering sites so that the method does not require any extraordinary transmission power stability.

The reflection element may be arranged at the end of the optical path behind the reflection place to be examined and it may then be simply an end face of a light waveguide, which end face is ground orthogonally with respect to the optical axis and is embedded a medium having a known refractive index.

In a measuring device which has a simple construction and can be easily handled by the user the reflection element is arranged in the optical path before the reflection place to be examined. Such a reflection place may consist of, for example, two light waveguides whose end faces are spaced and face each other coaxially, the space being filled with a transparent medium, preferably an adhesive whose refractive index differs from that of the light waveguide. The desired reflection factor can be set by suitable choice of the refractive index.

Preferably, an optical delay line is arranged between the reflection element and the reflection area to be examined and has such a minimum length that the signals from the beginning and the end of the delay line can be unambiguously distinguished by the OTDR.

The reflections of the reflection elements can be generated in several known manners, particularly in that the element comprises an end of a light waveguide fixed in a housing whose light exit face is formed with an optical discontinuity to provide the desired reflection.

In one embodiment the end face of the light waveguide is embedded in a medium whose refractive index is different from that of the light waveguide.

A further means for generating a predetermined reflection is characterized in that the end face of the light waveguide stands with respect to the optical axis at an angle which is different from 90°.

A reflection element which can be easily handled and is very suitable for use as an accessory unit for an OTDR is characterized in that one end of a light waveguide remote from the reflection element is provided with an optical connector and has such a minimum length that signals reflected from the end and the beginning can be distinguished by the OTDR.

If required, a plurality of such reflection elements with stepped reflection factors may be associated with an OTDR for the purpose of using it as a reflection measuring device.

DETAILED DESCRIPTION OF THE PREFERRED EMBODIMENT

Figure 1:
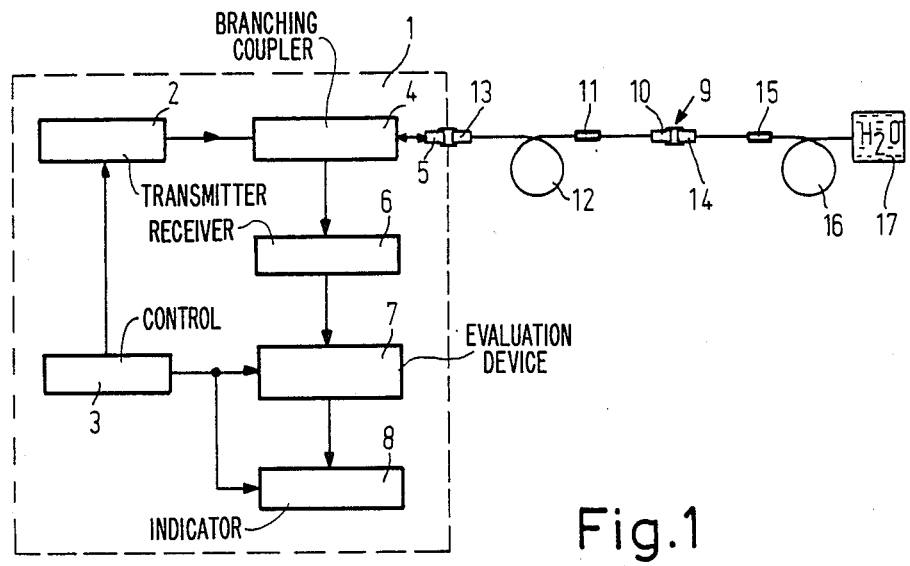
FIG. 1 shows a measuring device suitable for performing the method according to the invention.

In FIG. 1 the reference numeral 1 denotes an optical backscattering measuring device (OTDR) of the conventional type. It comprises an optical transmitter 2 with a laser diode which is triggered by a control circuit 3 and whose transmitted light is applied via a branching coupler 4 to a connector 5.

The light backscattered by a light waveguide to be connected is directed by the directional coupler 4 onto an optical receiver 6 (photodiode) whose electrical output signal is processed in an evaluation device 7 and is indicated in the desired transformed form by an indicator device 8. In order that transmitted and received signals are coordinated as a function of time, the evaluation device 7 and the indicator device 8 are also triggered by the control circuit 3.

According to FIG. 1 the OTDR is used for measuring the reflection factor R of the connector pair 9. A measuring construction is chosen which can be realized in a rapid and simple way. A light waveguide connected to a connector 10 is connected via a splice 11 to a delay line 12 which is coupled to the connector 5 of the OTDR 1 via a connector 13. The light waveguide coming from the other half 14 of the connector pair 9 is connected via a splice 15 to a delay light waveguide 16 of the end face which at the other end, which is orthogonal to the optical axis, is embedded in a medium 17.

If the refractive index of this medium (for example water) is smaller than that of the delay light waveguide 16, a reflection is the result whose amount or whose reflection factor $R_N$ can be calculated.

The OTDR 1 detects backscattering signals which originate from any place in the optical path between the connector 13 and the medium 17. As will be explained with reference to FIG. 3, only the areas of the connector pair 9 and of the end face of the delay light waveguide 16 are to be examined for measuring the reflection factor R.

Figure 3:
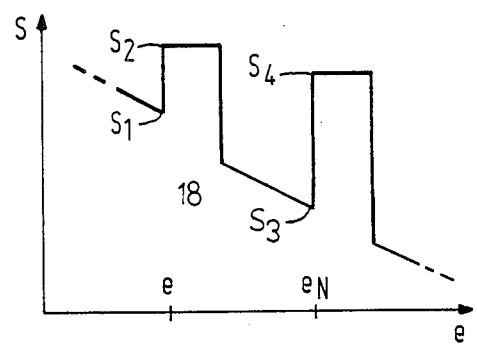
FIG. 3 shows diagrammatically the signal waveform measured in accordance with the invention.

FIG. 3 shows schematically the waveform of the transformed signal S indicated by the indicator device 8 of the OTDR 1 in a logarithmic form and not to scale in the relevant area over the length 1 which is a measure of the distance of each backscattering site in the optical path to be examined. A backscattering signal $S_1$ is measured at the area directly in front of the reflection area of the connector pair 9 to be examined, a signal $S_2$ is measured at the reflection area itself, a signal $S_3$ is measured directly before the end face of the delay light waveguide 16 and a signal $S_4$ is measured at the end face of this delay light waveguide 16 operating as a reflection element.

The splices 11 and 15 may be assumed to be free from losses, whilst the connector pair 9 has an overall attenuation which may be taken into account.

The OTDR transmission signal should be timed in such a way that signals $S_2$ and $S_4$ having a stable final value can be detected, i.e. to ensure correct operation, specific portions of these signals should extend substantially parallel to the coordinate axis.

The signals $S_1$ to $S_4$ indicated by the indicator device 8 are obtained as follows:

$S_1 = -5 \log (P_o e^{-\alpha \cdot l} \alpha_R)$ $S_2 = -5 \log (R\, P_o e^{-\alpha \cdot l})$ $S_3 = -5 \log (P_o e^{-\alpha \cdot l_N} 10^{-a/10} \alpha)$ $S_4 = -5 \log (R_N P_o e^{-\alpha \cdot l_N} 10^{-a/10})$ $\alpha$ = attenuation constant of light waveguide in dB/km
$\alpha_R$ = backscattering coefficient of light waveguide
R = reflection factor of reflection place to be examined
$R_N$ = reflection factor of reflection element $P_o$ = coupled-in transmission power a = coupling attenuation of connector pair 9 l = length of path up to reflection place in km $l_N$ = length of path up to reflection element in km
This results in the following equation:

$$-10 \log (R_N/R) = 2 (S_4 - S_2) + 10 \log e^{-\alpha(l_N - l)} + 2a$$

The reflection factor R to be found thus results independently of the coupled-in transmission power $P_o$.

Since the values $\alpha$ and a are generally very small, the corresponding members of the above-mentioned equation may generally be neglected. However, the attenuation constant also results by measuring the slope of the characteristic curve portion 18 in FIG. 3 so that a correction of the corresponding member is readily possible. If required, the coupling attenuation a may also be taken into account for correction.

Figure 2:
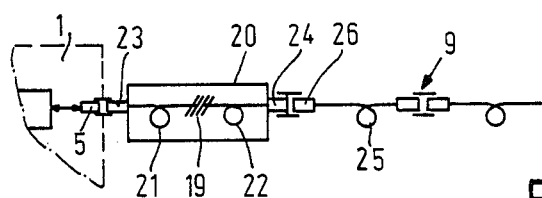
FIG. 2 shows a modification of the measuring device of FIG. 1 including a reflection element which can be connected by means of connector pairs between the OTDR and the reflection area to be examined.

In the modification of the measuring device according to FIG. 2 the reflection area 19 is accommodated in a housing 20. The end faces of two delay light waveguides 21 and 22 are spaced and face each other coaxially. The space is filled with a transparent adhesive to form the reflection area 19 and the refractive index of this adhesive differs to the required extent from that of the delay light waveguides 21 and 22 so that the desired reflection factor $R_N$ is obtained. The other ends of the delay light waveguides 21 and 22 terminate in connectors 23 and 24 of the housing 20. The connector pair 9 to be examined is connected via a delay light waveguide 25 to the connector 26 which in its turn is coupled to the connector 24 of the housing 20.

The use of connectors enables a reflection element 19 as shown in FIG. 3 to be easily included as an accessory unit for the OTDR 1, thus substantially extending its use as a reflection measuring device with little trouble.

In the embodiments according to FIGS. 1 and 2 it is assumed that there is only one reflection place to be examined. It is of course also possible to subject a plurality of reflection place in an optical path to a measurement.

What is claimed is:

1. A method of measuring the optical radiation energy reflected by a reflection place in an optical path as a relative fraction of energy coupled to said path by an optical transmitter, comprising arranging a reflection element having a known reflection factor in the optical path that includes the reflection place; transmitting radiation along said optical path; measuring the optical power backscattered from said reflection place and from said reflection element; and determining the energy reflected from the reflection place from the optical power backscattered from the reflection place and from the reflecting element.

2. A method as claimed in claim 1, characterized in that the reflection element (17) is arranged in the optical path (16) behind a reflection place (9) to be examined.

3. A method as claimed in claim 1, characterized in that the reflection element (19) is arranged in the optical path before the reflection place (9) to be examined.

4. A method as claimed in claim 1 characterized in that an optical delay line (16, 22) is arranged between the reflection element (17, 19) and the reflection place to be examined said delay line characterized by a length such that the signals reflected from the beginning and the end of the delay line (16, 22) can be unambiguously distinguished.

5. A reflection element for performing the method as claimed in claim 1, characterized in that the element comprises an end of a light waveguide fixed in a housing (17, 20) whose light exit face is formed with an optical discontinuity to provide the desired reflection.

6. A reflection element as claimed in claim 5, characterized in that the end face of the light waveguide (21) is embedded in a medium (19) whose refractive index is different from that of the light waveguide.

7. A reflection element as claimed in claim 5, characterized in that the end face of the light waveguide (16, 21) stands with respect to the optical axis at an angle which is different from 90°.

8. A reflection element as claimed in claim 5, characterized in that one end of a light waveguide (21, 22) remote from the reflection element (19) is provided with an optical connector and has such a minimum length that signals reflected from the end and the beginning can be distinguished by the OTDR (1).

* * * * *